Oct. 1, 1935.   P. A. BORDEN ET AL   2,015,838
TEMPERATURE MEASURING AND/OR CONTROL APPARATUS
Filed Dec. 5, 1933
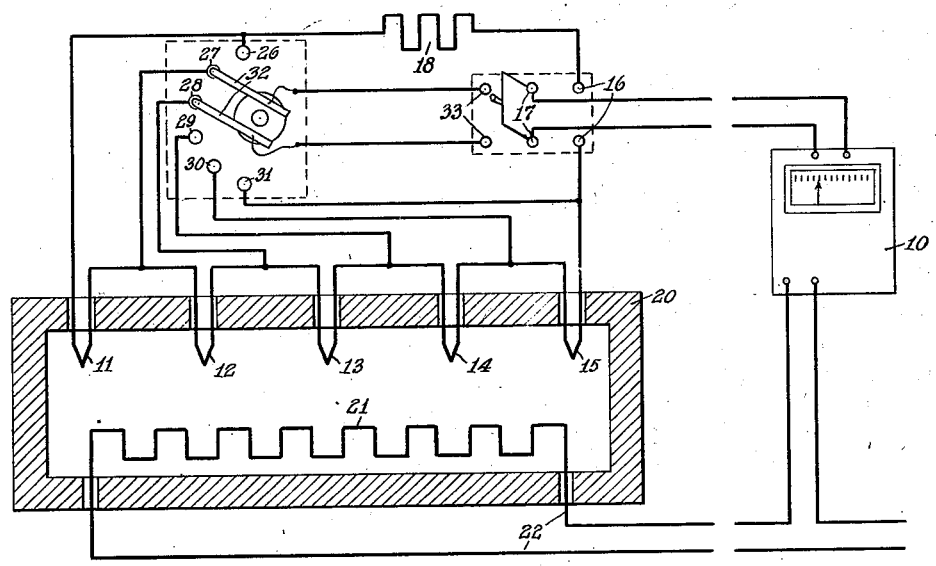
INVENTORS
PERRY A. BORDEN AND
HIBBERT W. MOSS
BY
ATTORNEY Patented Oct. 1, 1935

2,015,838

UNITED STATES PATENT OFFICE 2,015,838

TEMPERATURE MEASURING AND/OR CONTROL APPARATUS

Perry A. Borden, Waterbury, Conn., and Hibbert W. Moss, Detroit, Mich., assignors to The Bristol Company, Waterbury, Conn., a corporation of Connecticut Application December 5, 1933, Serial No. 700,960

3 Claims. (Cl. 73—32)

The invention relates to apparatus for the measuring and/or control of temperature, and more particularly to a thermoelectric system in which the primary measurement is effected by the use of a plurality of thermocouples distributed at selected points of a furnace, oven or other space in which the temperature under consideration exists.

The invention has for an object, in a system of this nature, to provide for means whereby any desired couple of the group may be selectively connected to the measuring and/or control instrument of the system for measurement and/or operation by a single couple of the group as well as by means of the group itself. This is of particular advantage in many installations requiring the application of controlled heat, for example, as in japanning, annealing, or bake ovens wherein it is desirable to maintain a constant mean temperature throughout the oven rather than a constant temperature at any particular portion of the oven. It is also desirable and important to be able to ascertain the temperature prevailing in any particular portion of the oven in order that a watch may be kept for conditions tending toward localized and injurious overheating or abnormal cooling.

In carrying out the invention, these features are attained by combining with, for example, a thermoelectric pyrometer embodying a measuring and/or control instrument and a plurality of normally interconnected thermocouples adapted for connection to the instrument to actuate the same, manually operable means adapted for individual connection with the respective couples for selectively connecting to said instrument any desired one of the couples and therewith disconnecting the remaining couples of the group.

The nature of the invention, however, will best be understood when described in connection with the accompanying drawing which is a diagrammatic view illustrating the arrangement and connection of the novel measuring and control system.

Referring to the drawing, the invention is shown by way of example as applied to a thermoelectric pyrometer system embodying a measuring and/or control instrument 10 which may be of the type set forth in U. S. Letters Patent #1,675,359. To this instrument is adapted to be connected for actuation of the same a plurality of thermocouples 11, 12, 13, 14 and 15, each of like character to develop substantially equal E. M. F.'s under like temperature conditions. These couples are shown as connected in series, and the terminals of this group of couples are connected to the respective poles 16 of a double-pole double-throw switch whose middle poles 17 are connected to the instrument 10.

A resistance 18 is connected in series with the group of thermocouples 11—15 ahead of their connection to the poles 16; and the value of this resistance is so selected that the current passing through the instrument 10, with all the couples connected in series and at the same temperature, is the same as that resulting from the connection of but a single couple to the instrument at the particular temperature with said resistance cut out.

Thus, if the resistance value of the instrument be represented by "R" and there be "N" couples in the system, the resistance 18 (disregarding that of the connecting circuits and the couples) would be made equal to R (N—1), so that the resistance of the whole circuit including the instrument would be equal to R×N.

The arrangement hereinbefore described is that for normal operation of the system, for example, for the control of the temperature of a furnace 20 which may be heated by resistor 21 deriving energy from the power mains 22 and the supply of which is controlled by the instrument 10 in manner well understood. The thermocouples 11—15 are then arranged to project into the furnace space at different portions thereof, the instrument 10 being influenced by the mean value of the E. M. F.'s of the different couples.

When it is desired to ascertain the temperature prevailing at a particular portion of the furnace and/or effect control therewith of the temperature of said furnace, the thermocouple located at this particular portion is arranged to be connected to said instrument 10 and at the same time provision is made to disconnect the remaining thermocouples of the group therefrom, as well as the resistance 18. This may conveniently be effected by means of a two-pole, multiple contact dial-type switch embodying a plurality of switch points 26, 27, 28, 29, 30 and 31, the points 27, 28, 29, 30 and 31 being connected respectively to one of the terminals of the corresponding thermocouples 11, 12, 13, 14 and 15 and the contact 26 to the opposite terminal of the couple 11. The switch is also provided with a moving member having the two arms 32 which are connected to the opposite end poles 33 of the double-pole double-throw switch and are also adapted to span any adjacent pair of the contacts 26—31.

To select a particular couple, the switch-moving element will be turned to the corresponding contact points for the selected thermocouple, and the double-throw switch is to be thrown over to connect the poles 17 to the poles 33. The instrument 10 will then receive a current representative of the temperature prevailing at the particular portion of the furnace at which the couple is located and not of the mean or average value of the temperature throughout the oven; and will control as represented by the control point to which the instrument is set. By shifting the switch arms 32 from couple to couple, it will be possible to make a survey of the temperature conditions throughout the oven at any time; and, if desired, also to leave the instrument connected to a selected couple for control therefrom.

We claim:

1. The combination with a thermoelectric pyrometer embodying a measuring and/or control instrument, and a group of thermoelectric couples connected in series, a double-throw double-pole switch, the mid-poles of which are connected to the instrument, and the leads from the group being connected to one pair of end poles of the switch, a multi-contact switch embodying individual stationary contacts and a pair of movable contact arms adapted to engage successive pairs of said contacts, the said arms being connected to the opposite pair of end poles of the double-throw double-pole switch, and a terminal of the individual couples being respectively connected to the individual stationary contacts of the multi-contact switch.

2. The combination with a thermoelectric pyrometer embodying a measuring and/or control instrument, and a group of interconnected thermoelectric couples; of a double-throw double-pole switch, the mid-poles of which are connected to the instrument, and the leads from the group being connected to one pair of end poles of the switch, a multi-contact switch embodying individual stationary contacts and a pair of movable contact arms adapted to engage successive pairs of said contacts, the said arms being connected to the opposite pair of end poles of the double-throw double-pole switch, and a terminal of the individual couples being respectively connected to the individual stationary contacts of the multi-contact switch.

3. The combination with a thermoelectric pyrometer embodying a measuring and/or control instrument, and a group of thermoelectric couples connected in series; of a double-throw double-pole switch, the mid-poles of which are connected to the instrument, and the leads from the group being connected to one pair of end poles of the switch, a multi-contact switch embodying individual stationary contacts and a pair of movable contact arms adapted to engage successive pairs of said contacts, the said arms being connected to the opposite pair of end poles of the double-throw double-pole switch, and a terminal of the individual couples being respectively connected to the individual stationary contacts of the multi-contact switch, together with means for limiting current flow in the instrument in accordance with the number of said couples in series.

PERRY A. BORDEN.
HIBBERT W. MOSS.